(12) United States Patent
Decady

(10) Patent No.: US 10,833,561 B1
(45) Date of Patent: Nov. 10, 2020

(54) VERSATILE POWER PLANT SYSTEM

(71) Applicant: Robillard Decady, Miami, FL (US)

(72) Inventor: Robillard Decady, Miami, FL (US)

( * ) Notice: Subject to any disclaimer, the term of this patent is extended or adjusted under 35 U.S.C. 154(b) by 0 days.

(21) Appl. No.: 16/538,927

(22) Filed: Aug. 13, 2019

(51) Int. Cl.
| | |
|---|---|
| *H02K 7/18* | (2006.01) |
| *F03D 9/25* | (2016.01) |
| *B60K 1/04* | (2019.01) |
| *H02K 11/00* | (2016.01) |
| *H02K 11/04* | (2016.01) |

(52) U.S. Cl.
CPC ............. *H02K 7/183* (2013.01); *B60K 1/04* (2013.01); *F03D 9/25* (2016.05); *H02K 7/1823* (2013.01); *H02K 11/0094* (2013.01); *H02K 11/046* (2013.01)

(58) Field of Classification Search
CPC .. H02K 7/183; H02K 7/1823; H02K 11/0094; H02K 11/046; F03D 9/25; B60K 1/04
See application file for complete search history.

(56) References Cited

U.S. PATENT DOCUMENTS

| | | | | |
|---|---|---|---|---|
| 4,306,157 | A * | 12/1981 | Wracsaricht | F03B 17/061 290/54 |
| 5,990,590 | A * | 11/1999 | Roesel, Jr. | F02N 11/04 310/112 |
| 6,700,215 | B2 * | 3/2004 | Wu | B60K 25/08 290/44 |
| 8,436,485 | B1 * | 5/2013 | Smith | F03D 9/11 290/55 |
| 8,860,357 | B1 * | 10/2014 | Decady | B60K 16/00 320/101 |
| 2011/0012361 | A1 * | 1/2011 | Lee | F03B 13/264 290/55 |
| 2013/0063071 | A1 * | 3/2013 | Walters | B60L 8/006 320/101 |
| 2014/0077499 | A1 * | 3/2014 | Joo | B63J 3/02 290/54 |
| 2020/0055403 | A1 * | 2/2020 | Overstreet | F03D 9/32 |
| 2020/0220439 | A1 * | 7/2020 | Sigmar | H02K 7/20 |

* cited by examiner

*Primary Examiner* — Tulsidas C Patel
*Assistant Examiner* — Joseph Ortega
(74) *Attorney, Agent, or Firm* — Albert Bordas, P.A.

(57) ABSTRACT

A versatile power plant system, which has a blower/fan system, a fan system, a generator/alternator device, a regulator, a DC/AC inverter generator, an AC/DC transformer rectifier unit, and an AC/DC rectifier diode, wherein electrical energy is generated. The generator alternator device has a drum and a main body having a generator shaft. The blower/fan system is connected to the fan system, and the fan system is connected to the generator/alternator device. The generator/alternator device is connected to the regulator and the regulator is connected to the DC/AC inverter generator. The DC/AC inverter generator is connected to the AC/DC transformer rectifier unit, and the AC/DC transformer rectifier unit is connected to the AC/DC rectifier diode. The AC/DC rectifier diode is connected to an electrical device or a rechargeable battery bank to deliver the electrical energy. The electrical energy may be generated from a primary source of energy.

19 Claims, 5 Drawing Sheets

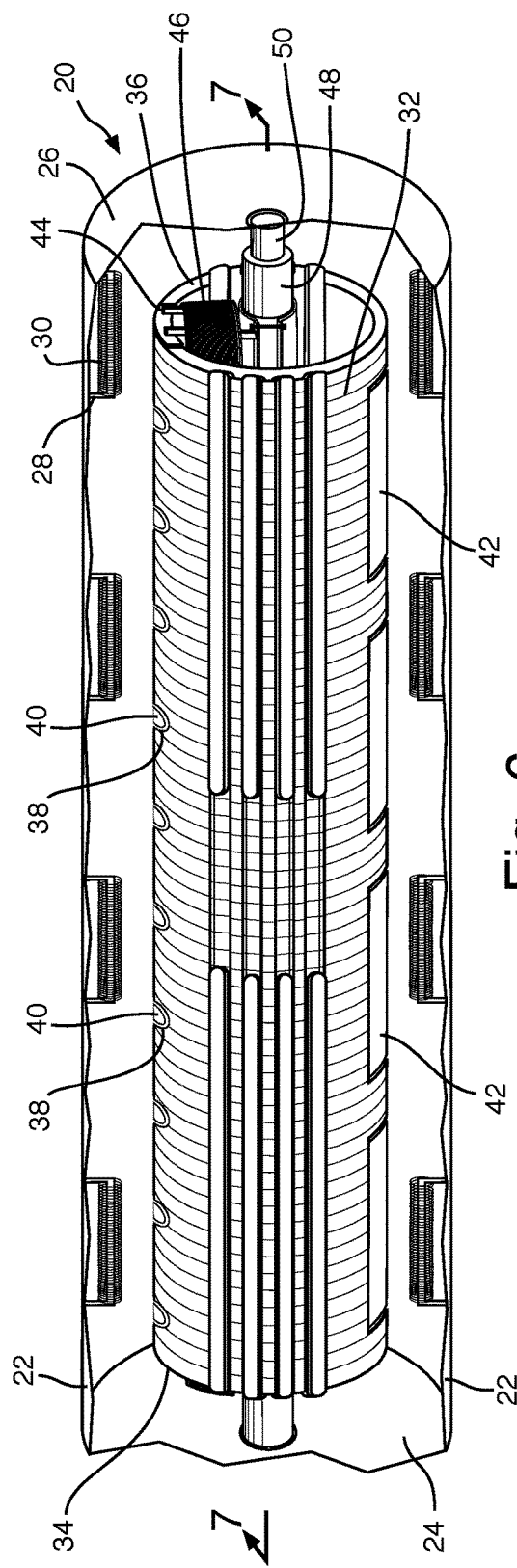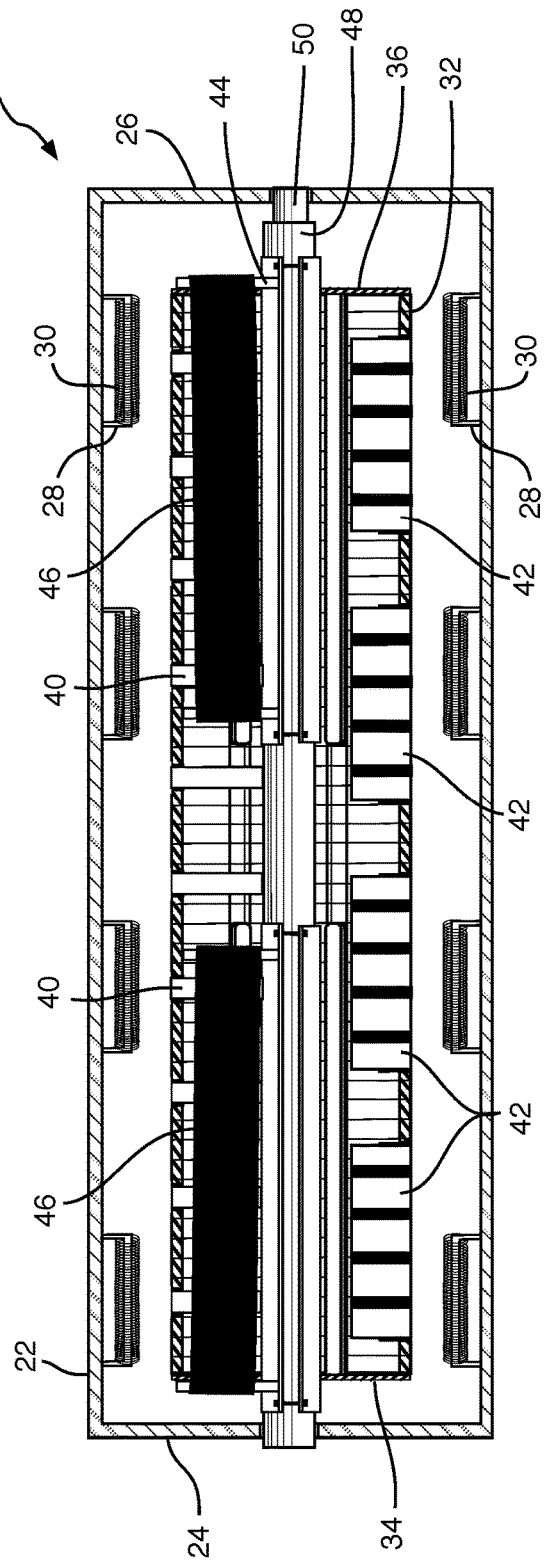

US 10,833,561 B1

VERSATILE POWER PLANT SYSTEM

BACKGROUND OF THE INVENTION

1. Field of the Invention

The present invention relates to power plants, and more particularly, to power plants that produce electrical energy.

2. Description of the Related Art

Applicant is not aware of any power plant system having the novel features of the present invention.

SUMMARY OF THE INVENTION

The present invention is a versatile power plant system, comprising a blower/fan system having a fan assembly and a blower, a fan system, a generator/alternator device, a regulator, a DC/AC inverter generator, an AC/DC transformer rectifier unit, and an AC/DC rectifier diode, wherein electrical energy is generated.

The fan assembly comprises a housing, an opening, a first set of blades, and a flat magnet positioned over a central plate. The blower comprises first and second plates joined by a cylindrical body, a wheel, a ring magnet, a second set of blades, and a shaft. The flat magnet and the ring magnet join the fan assembly and the blower.

The generator/alternator device comprises a drum having first and second drum ends, and a plurality of coil supports having a respective peripheral coil. The generator/alternator device further comprises a main body having first and second ends, and a set of holes positioned in line and having a respective magnet inside. The main body further comprises a set of magnet blocks positioned in line and opposite to the set of holes having respective magnet.

The generator/alternator device further comprises coils, coil holders, a generator shaft, and a shaft holder. The coils are positioned inside the main body and supported onto the coil holders, which are fixed to the shaft holder. The generator shaft passes through the main body and extends from the first and second ends, until reach and support on the first and second drum ends.

The drum comprises a first predetermined diameter, and the main body comprises a second predetermined diameter wherein the first predetermined diameter is larger than the second predetermined diameter.

The blower/fan system is connected to the fan system with the shaft. The fan system is connected to the generator/alternator device. The generator/alternator device is connected to the regulator. The regulator is connected to the DC/AC inverter generator. The DC/AC inverter generator is connected to the AC/DC transformer rectifier unit and the AC/DC transformer rectifier unit is connected to the AC/DC rectifier diode.

The electrical energy is generated from a primary energy source. The fan system receives kinetic energy from the primary energy source or from the blower/fan system. The generator/alternator device transforms the kinetic energy in the electrical energy. The primary energy source is wind or water. The AC/DC rectifier diode delivers the electrical energy to an electrical device, or to a rechargeable battery bank to store the electrical energy.

It is therefore one of the main objects of the present invention to provide a versatile power plant system.

It is another object of this invention to provide a versatile power plant system to generate electrical energy.

It is another object of this invention to provide a versatile power plant system to generate electrical energy from a primary energy source.

It is another object of this invention to provide a versatile power plant system to generate electrical energy from any source.

It is another object of this invention to provide a versatile power plant system, which is of a durable and reliable construction.

It is yet another object of this invention to provide a versatile power plant system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 is an isometric view with a cut of the generator/alternator device.

FIG. 7 is a cut view taken along lines 7-7 from FIG. 6.

V. DETAILED DESCRIPTION OF THE PREFERRED EMBODIMENT

Figure 1:
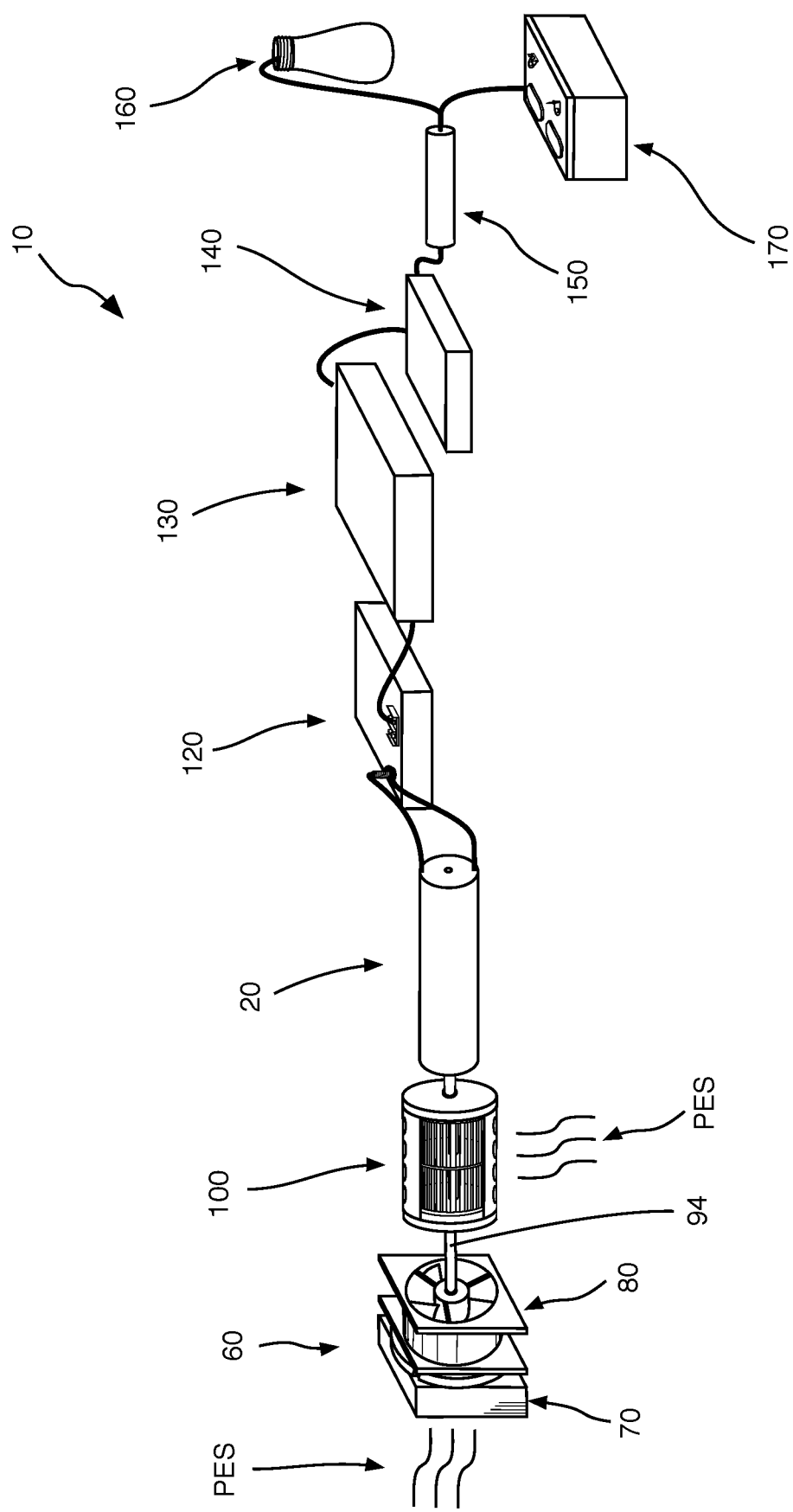
FIG. 1 is a diagram of the present invention.

Referring now to the drawings, the present invention is a versatile power plant system, and is generally referred to with numeral 10. It can be observed that it basically includes generator/alternator device 20, blower/fan 60, fan system 100, regulator 120, DC/AC inverter generator 130, AC/DC transformer rectifier unit 140, and AC/DC rectifier diode 150.

As seen in FIG. 1, blower/fan 60 is connected to fan system 100. Fan system 100 is connected to generator/alternator device 20, and generator/alternator device 20 is connected to regulator 120. Regulator 120 is connected to DC/AC inverter generator 130. DC/AC inverter generator 130 is connected to AC/DC transformer rectifier unit 140, and AC/DC transformer rectifier unit 140 is connected to AC/DC rectifier diode 150.

Blower/fan 60 comprises fan assembly 70 and blower 80. Blower/fan 60 is connected to fan system 100 with shaft 94.

AC/DC Transformer rectifier unit 140 is an electronic device that can be used to convert alternating current (AC), which reverses direction, into direct current (DC). This process is known as rectification.

AC/DC rectifier diode 150 is a two-lead semiconductor that allows current to pass in only one direction.

Fan system 100 receives kinetic energy from primary energy source PES and/or from blower/fan 60. Blower/fan 60 also may also receive kinetic energy from primary energy source PES. Generator/alternator device 20 transforms the kinetic energy into the electrical energy. Primary energy source PES may be wind or water.

A connection from AC/DC rectifier diode 150 provides electrical energy to electrical device 160. In addition, AC/DC rectifier diode 150 may be connected to rechargeable battery bank 170, which stores the electrical energy. Electrical devices 160 are defined as devices that use or generate electricity and transform it into another form of energy, such as motion, heat or light. Electrical devices 160 include, but are not limited to, light bulbs.

In a preferred embodiment, rechargeable battery bank 170 comprises a plurality of rechargeable batteries, defined as electrochemical cells. They are also known as secondary cells because their electrochemical reactions are electrically reversible. Rechargeable batteries come in many different shapes and sizes, ranging anything from a button cell to megawatt systems connected to stabilize an electrical distribution network. Several different combinations of chemicals are commonly used, including: lead-acid, nickel cadmium (NiCd), nickel metal hydride (NiMH), lithium ion (Li-ion), and lithium ion polymer (Li-ion polymer). Rechargeable batteries have lower total cost of use and environmental impact than disposable batteries. Rechargeable batteries can be recharged and used many times.

Blower/fan 60 of approximately 100 mw can be used to power generator/alternator device 20 in wind tunnels and they also can be used to recharge other batteries banks.

Any types of thrust or thrusters can drive or move generator/alternator device 20 generating electricity. Thrusts may originate from nuclear power plants, steam power, rocket power, jet engines, electric fan blades, and blowers.

Figure 2:
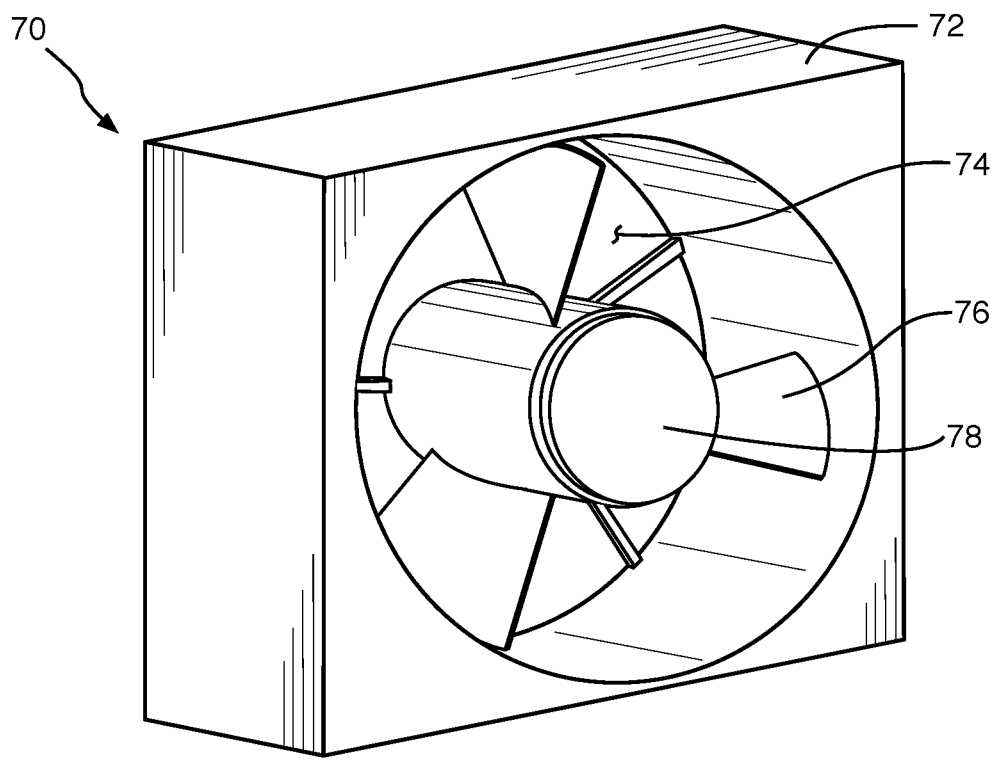
FIG. 2 is an isometric view of a fan assembly of the present invention.

As seen in FIG. 2, fan assembly 70 comprises housing 72 having opening 74 and blades 76. Fan assembly 70 further comprises flat magnet 78 positioned on a central plate.

Figure 3:
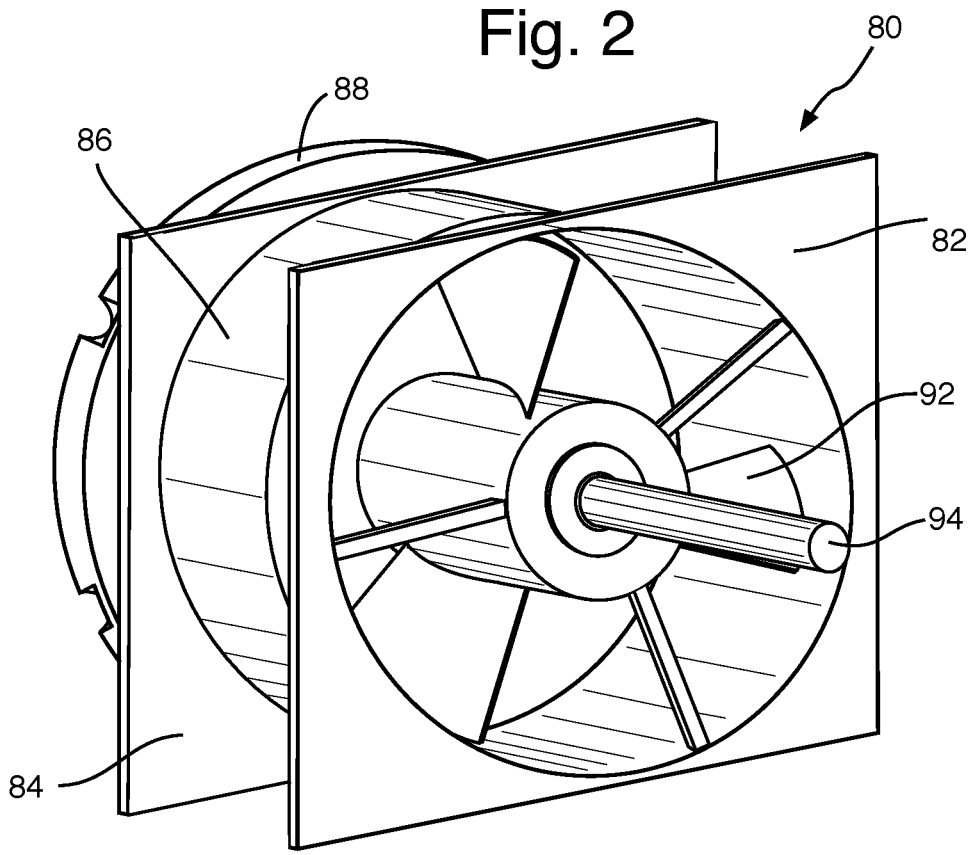
FIG. 3 is a first isometric view of a blower of the present invention.
Figure 4:
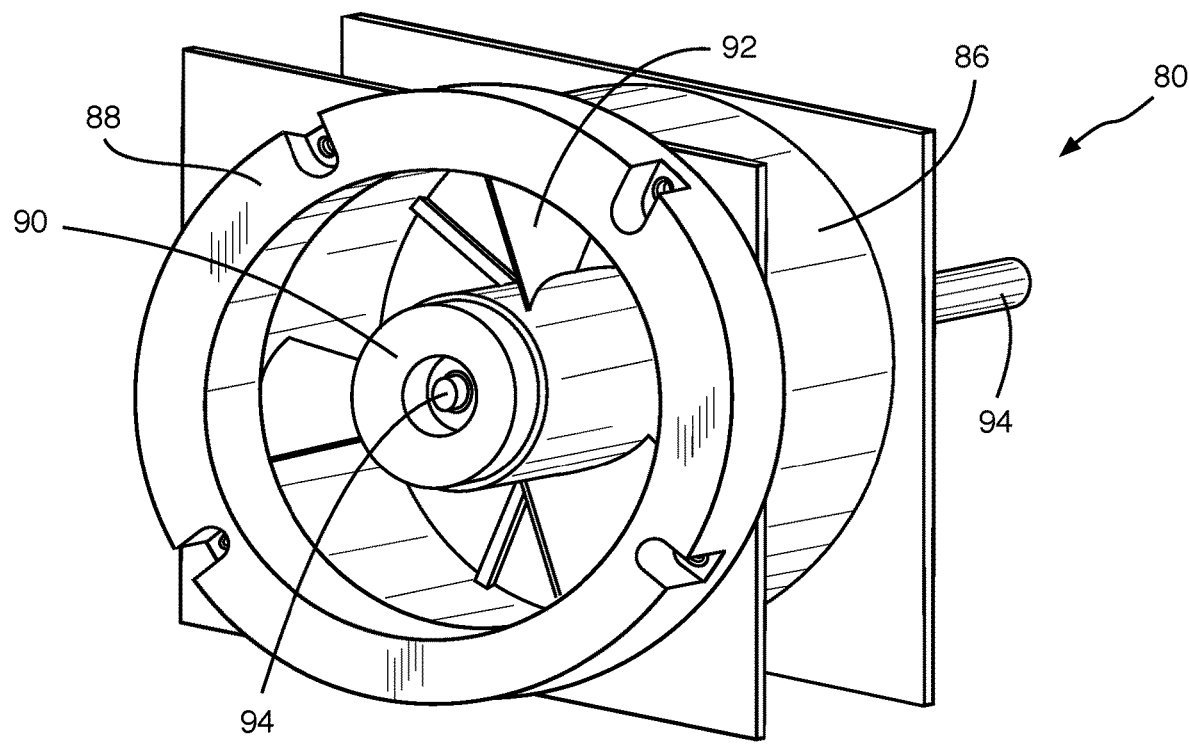
FIG. 4 is a second isometric view of a blower of the present invention.

As seen in FIGS. 3 and 4, blower 80 comprises first and second plates 82 and 84 joined by cylindrical body 86, wheel 88, ring magnet 90, blades 92, and shaft 94. Flat magnet 78, seen in FIG. 2, and ring magnet 90 join fan assembly 70 and blower 80.

Figure 5:
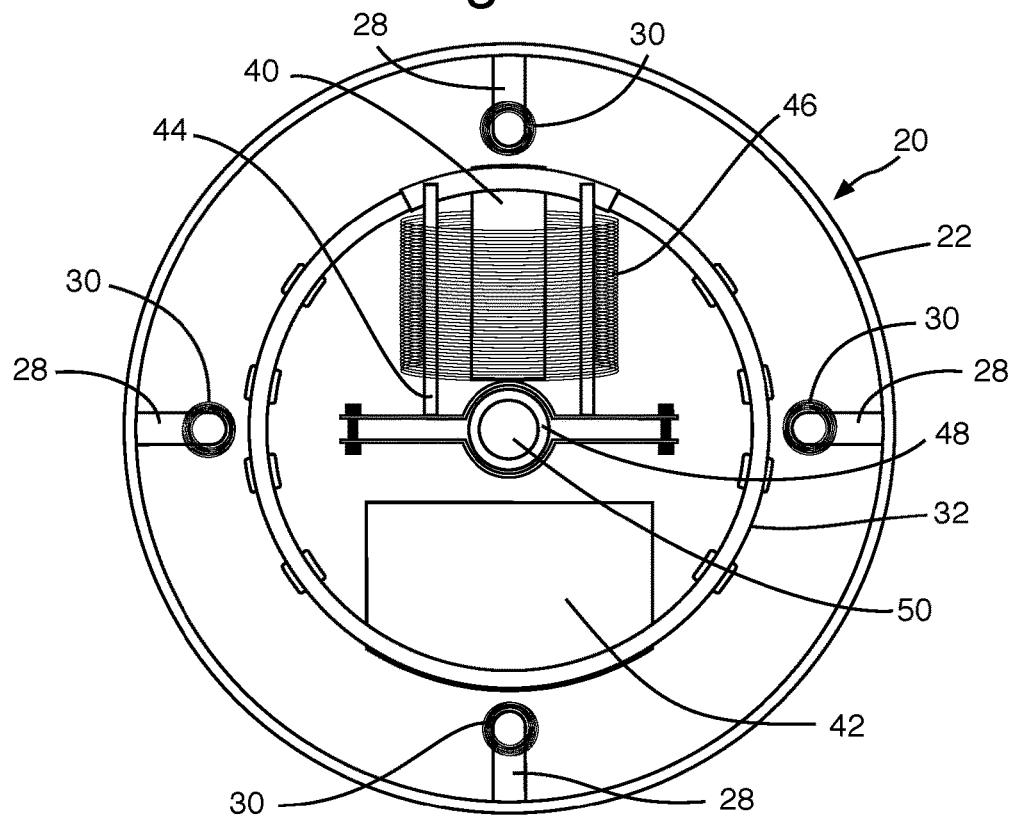
FIG. 5 is a front view of a generator/alternator device without an end.

As seen in FIG. 5, generator/alternator device 20 comprises drum 22, main body 32, coil holders 44, coils 46, shaft holder 48, and generator shaft 50.

Drum 22 comprises a first predetermined diameter, and main body 32 comprises a second predetermined diameter wherein the first predetermined diameter is larger than the second predetermined diameter. Drum 22 covers main body 32 and supports generator shaft 50. Drum 22 comprises peripheral coils 30 supported onto coil supports 28. Coil supports 28 are fixed onto an interior face of drum 22.

In a preferred embodiment there are four sets of peripheral coils 30 on respective coil support 28 relatively equidistant, whereby each coil supports 28 extends radially from the interior face of drum 22 without reaching main body 32.

As seen in FIGS. 6 and 7 drum 22 has first and second drum ends 24 and 26. Each set of peripheral coils 30 supported onto respective coil support 28 is positioned in line along the interior face of drum 22.

Main body 32 has first and second ends 34 and 36, and a set of holes 38 having respective magnet 40 inside. The set of holes 38 is positioned in line. Main body 32 further comprises a set of magnet blocks 42 also positioned in line and opposite to the set of holes 38 having respective magnet 40.

Coils 46 are positioned inside main body 32 and supported onto coil holders 44. Coil holders 44 are fixed to shaft holder 48. Generator shaft 50 passes through main body 32 and extends from first and second ends 34 and 36, until reaching and being supported on first and second drum ends 24 and 26 respectively. Magnets 40 are perpendicularly positioned to generator shaft 50.

Figure 8:
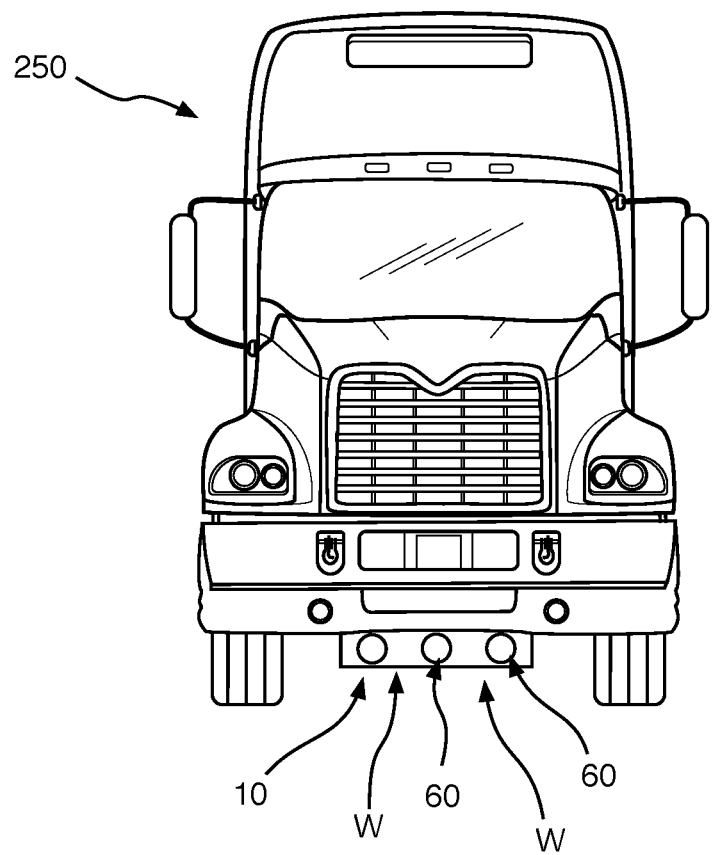
FIG. 8 is a front view of a truck having the present invention mounted.

As seen in FIG. 8, present invention 10 may be mounted onto any vehicle such as truck 250. In addition, oncoming wind force or wind streams W turn blades 92 of blower/fan 60 causing shaft 94 to rotate and transmit mechanical energy to generator alternator device 20, which transforms it to electrical energy. In this embodiment, electrical energy obtained is stored as an example in rechargeable battery bank 170, as seen in FIG. 1. In an alternate embodiment, present invention 10 may be The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A versatile power plant system, comprising:
   A) a blower/fan having a fan assembly and a blower, said fan assembly comprises a housing, an opening, a first set of blades, and a flat magnet positioned over a central plate;
   B) a fan system;
   C) a generator/alternator device;
   D) a regulator;
   E) a DC/AC inverter generator;
   F) an AC/DC transformer rectifier unit; and
   G) an AC/DC rectifier diode; wherein electrical energy is generated.

2. The versatile power plant system set forth in claim 1, further characterized in that said blower comprises first and second plates joined by a cylindrical body, a wheel, a ring magnet, a second set of blades, and a shaft.

3. The versatile power plant system set forth in claim 2, further characterized in that said fan assembly and said blower are joined by said flat magnet and said ring magnet.

4. The versatile power plant system set forth in claim 2, further characterized in that said blower/fan is connected to said fan system with said shaft, and said fan system is connected to said generator/alternator device.

5. The versatile power plant system set forth in claim 1, further characterized in that said generator/alternator device comprises a drum having first and second drum ends, and a plurality of coil supports having a respective peripheral coil.

6. The versatile power plant system set forth in claim 5, further characterized in that said generator/alternator device further comprises a main body having first and second ends, and a set of holes positioned in line and having a respective magnet inside.

7. The versatile power plant system set forth in claim 6, further characterized in that said main body further comprises a set of magnet blocks positioned in line and opposite to said set of holes having respective said magnet.

8. The versatile power plant system set forth in claim 6, further characterized in that said generator/alternator device further comprises coils, coil holders, a generator shaft, and a shaft holder.

9. The versatile power plant system set forth in claim 8, further characterized in that said coils are positioned inside said main body and supported onto said coil holders, which are fixed to said shaft holder.

10. The versatile power plant system set forth in claim 8, further characterized in that said generator shaft passes through said main body and extends from said first and second ends, until reaching and being supported on said first and second drum ends.

11. The versatile power plant system set forth in claim 6, further characterized in that said drum comprises a first predetermined diameter, and said main body comprises a second predetermined diameter wherein said first predetermined diameter is larger than said second predetermined diameter.

12. The versatile power plant system set forth in claim 1, further characterized in that said generator/alternator device is connected to said regulator and said regulator is connected to said DC/AC inverter generator.

13. The versatile power plant system set forth in claim 1, further characterized in that said DC/AC inverter generator is connected to said AC/DC transformer rectifier unit, and said AC/DC transformer rectifier unit is connected to said AC/DC rectifier diode.

14. The versatile power plant system set forth in claim 1, further characterized in that said electrical energy is generated from a primary energy source.

15. The versatile power plant system set forth in claim 14, further characterized in that said fan system receives kinetic energy from said primary energy source or from said blower/fan.

16. The versatile power plant system set forth in claim 15, further characterized in that said generator/alternator device transforms said kinetic energy in said electrical energy.

17. The versatile power plant system set forth in claim 14, further characterized in that said primary energy source is wind or water.

18. The versatile power plant system set forth in claim 1, further characterized in that said AC/DC rectifier diode delivers said electrical energy to an electrical device.

19. The versatile power plant system set forth in claim 1, further characterized in that said AC/DC rectifier diode delivers said electrical energy to a rechargeable battery bank to store said electrical energy.

* * * * *